(12) United States Patent
Hafer

(10) Patent No.: US 6,817,241 B2
(45) Date of Patent: Nov. 16, 2004

(54) POINT LEVEL DEVICE WITH AUTOMATIC THRESHOLD SETTING

(75) Inventor: Kevin G. Hafer, Douglassville, PA (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 10/155,060

(22) Filed: May 23, 2002

(65) Prior Publication Data

US 2002/0178808 A1 Dec. 5, 2002

Related U.S. Application Data

(60) Provisional application No. 60/294,791, filed on May 31, 2001.

(51) Int. Cl.$^7$ ............................................... G01F 23/00
(52) U.S. Cl. ...................... 73/304 C; 73/1.73; 73/1.34; 324/601
(58) Field of Search .............................. 73/304 C, 1.73, 73/1.34; 324/601

(56) References Cited

U.S. PATENT DOCUMENTS

| | | | | |
|---|---|---|---|---|
| 4,676,101 A | * | 6/1987 | Baughman | ................ 73/304 C |
| 4,800,755 A | | 1/1989 | Fathauer et al. | |
| 5,245,873 A | * | 9/1993 | Fathauer et al. | .......... 73/304 C |
| 5,553,479 A | | 9/1996 | Rauchwerger | |
| 5,755,136 A | * | 5/1998 | Getman et al. | ........... 73/290 V |
| 5,756,876 A | | 5/1998 | Wetzel et al. | ................ 73/1.73 |

* cited by examiner

Primary Examiner—Helen Kwok
Assistant Examiner—André K. Jackson
(74) Attorney, Agent, or Firm—Woodcock Washburn LLP (57) ABSTRACT

A system and method is provided for automatically setting a threshold for a point level device without having a user select whether a point level element is covered or uncovered. A first and second value is measured from a point level element. Whether the point level element is covered or uncovered is determined based on whether the second measured value has increased or decreased with respect to the first measured value. A threshold value is determined based on at least one of the first and second measured values.

33 Claims, 8 Drawing Sheets

POINT LEVEL DEVICE WITH AUTOMATIC THRESHOLD SETTING

CROSS REFERENCE TO RELATED APPLICATIONS

This application claims priority under 35 U.S.C. § 119(e) of U.S. Provisional Patent Application Ser. No. 60/294,791, filed May 31, 2001.

FIELD OF THE INVENTION

The invention generally relates to the field of point level monitoring. More particularly, the invention relates to automatically setting a threshold for a point level device, such as a capacitance point level device, without a user selecting whether the probe is currently covered or uncovered.

BACKGROUND OF THE INVENTION

One method of measuring a level of material in a tank is by using capacitance probes mounted to the tank. A capacitance probe may be used to determine a point level, that is, whether the material level is above or below a certain point. To make such a determination, electronics may measure probe capacitance. Because the capacitance from the probe to a reference point varies depending on whether or not the probe is covered, the electronics may compare the measured capacitance to a threshold value to determine whether or not the probe is covered.

In a conventional point level probe device, the probe is typically calibrated by covering the probe with material so that the device can learn the capacitance value of the probe when covered. Then, the probe is uncovered so that the device can learn the capacitance value of the probe when uncovered. The device sets a threshold value between the two values. For example, a user may fill a tank and calibrate the level device for the covered state. Then the user may empty the tank and calibrate the level device for the uncovered state and the device determines a value between the covered and uncovered value as the threshold. This technique may be unacceptable because it may involve adding and removing large quantities of material.

Another disadvantage with this technique is that there may be a considerable time lapse between the two calibration procedures. As such, it may take an unacceptably long time to calibrate both states. For example, the device may be first calibrated for the covered state. The device, however, may not be in the uncovered state for several months, for example, at the next plant shutdown for maintenance. Even if both states of a device are initially calibrated, over time the device may not perform optimally due to changes in probe capacitance, for example, due to material residue, coating effects, and the like. Also, if the dielectric properties of the material changes, the device may require recalibration.

In cases where calibrating both states is impractical, typically the level device is first calibrated in one state (e.g., the uncovered state) and a threshold capacitance is established by adding a fixed reference value (e.g. a stored predefined reference value) to the calibration value. Recent devices may perform continual adjustment of the threshold value thereby overcoming some of the problems of conventional point level devices. Such calibrations, however, typically require a user to select whether the probe is covered or uncovered. This can lead to errors if the user makes the wrong selection.

In view of the foregoing, there is a need for a system and method for automatically adjusting a threshold value for a point level device without a user selecting whether the probe is covered or uncovered.

SUMMARY OF THE INVENTION

The invention is directed to systems and methods for automatically adjusting a threshold for a point level device without a user selecting whether the probe is covered or uncovered.

In one embodiment, a method is provided for automatically setting a threshold for a point level device comprising the steps of measuring a first value from a point level element, measuring a second value from the point level element, determining whether the point level element is covered or uncovered based on whether the second measured value has increased or decreased with respect to the first measured value, and determining a threshold value based on at least one of the first and second measured values. The method may determine whether the point level element is covered or uncovered based on whether the second measured value has increased or decreased by a predefined amount with respect to the first measured value.

In another embodiment, a point level device is provided comprising a processor that measures a first value from a point level element, measures a second value from the point level element, determines whether the point level element is covered or uncovered based on whether the second measured value has increased or decreased with respect to the first measured value, and determines a threshold value based on at least one of the first and second measured values.

The above-listed features, as well as other features, of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings, and wherein.

DETAILED DESCRIPTION OF ILLUSTRATIVE EMBODIMENTS

The invention is directed to automatically adjusting a threshold for a point level device without a user selecting whether a point level element is covered or uncovered. The point level device may be a capacitance point level device, for example.

Figure 1:
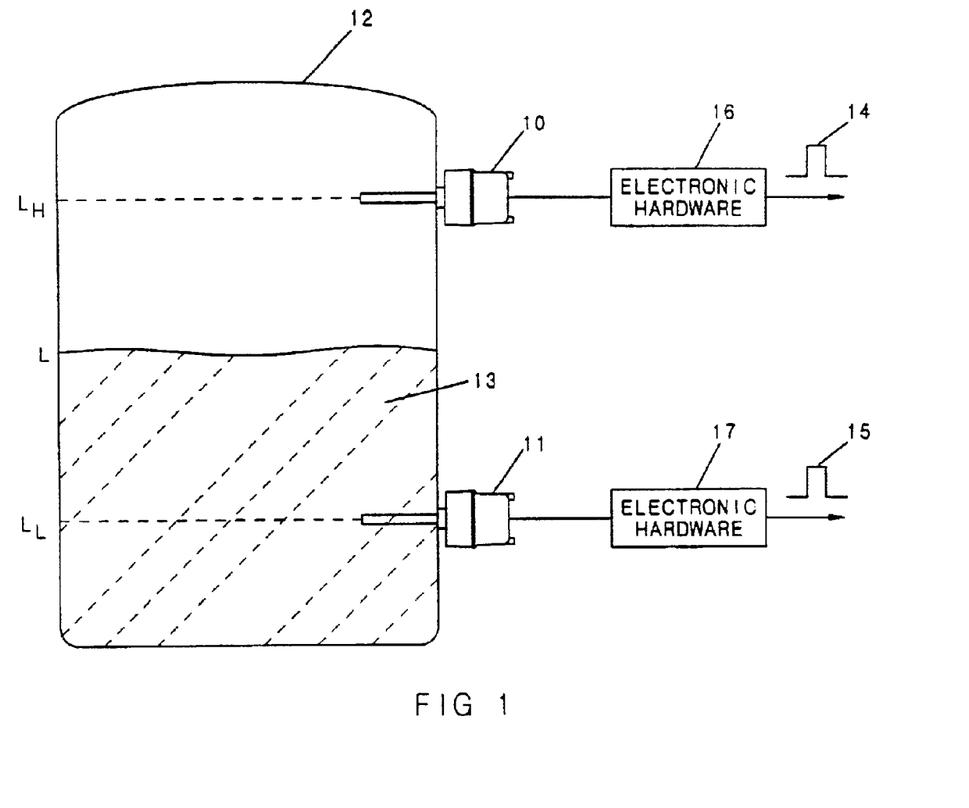
FIG. 1 is a diagram of an exemplary tank having illustrative capacitance point level probes and electronic hardware, in accordance with an embodiment of the invention.

As shown in FIG. 1, tank 12 contains material 13 which could be water, oil, solid material, or the like. Probe 10 is mounted proximate the top of the tank 12 and is used to monitor and indicate a high level of material 13 in tank 12. Probe 11 is mounted proximate the bottom of tank 12 and is used to monitor and indicate a low level of material 13 in tank 12. Capacitance probes 10, 11 are used to measure a capacitance (e.g., from probe 10, 11 to the tank wall) and the measured capacitance is used to determine if the probe is covered or uncovered. Specifically, electronic hardware 16, 17 measures the capacitance and compares the measured capacitance against a threshold. In this manner, probe 10 can be used for a high level fail safe (HLFS) indication and probe 11 can be used for a low level fail safe (LLFS) indication. In particular, level $L_H$ is the level where probe 10 becomes physically covered (and its threshold capacitance is reached). This may cause a switch in electronic hardware 16 to change state 14 (i.e., indicating a HLFS condition). Level $L_L$ is the level where probe 11 becomes physically uncovered. This may cause a switch in electronic hardware 17 to change state 15 (indicating a LLFS condition).

Figure 2:
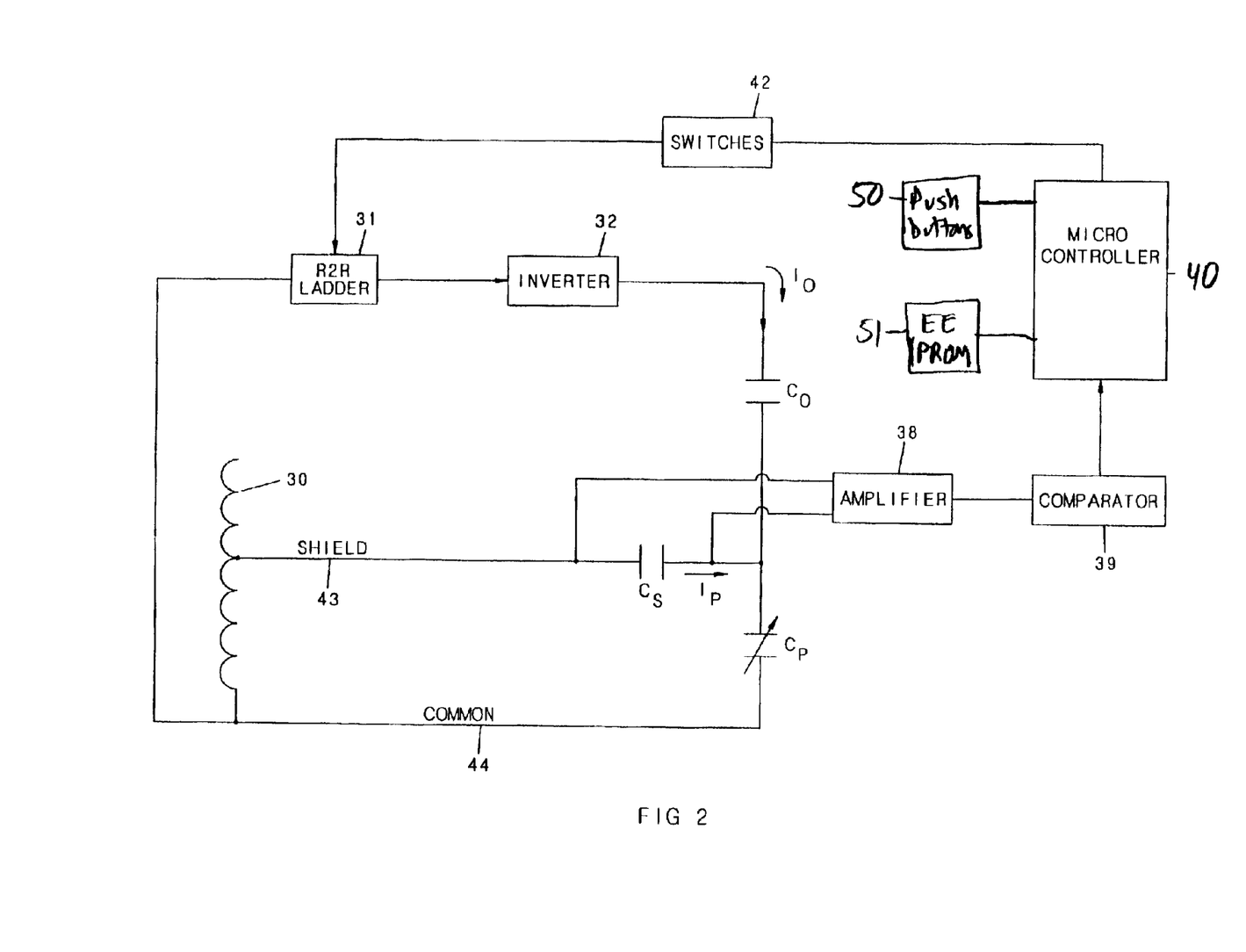
FIG. 2 is a schematic diagram of an illustrative circuit for use in automatically setting a threshold for a capacitance point level device, in accordance with an embodiment of the invention.
Figure 4A:
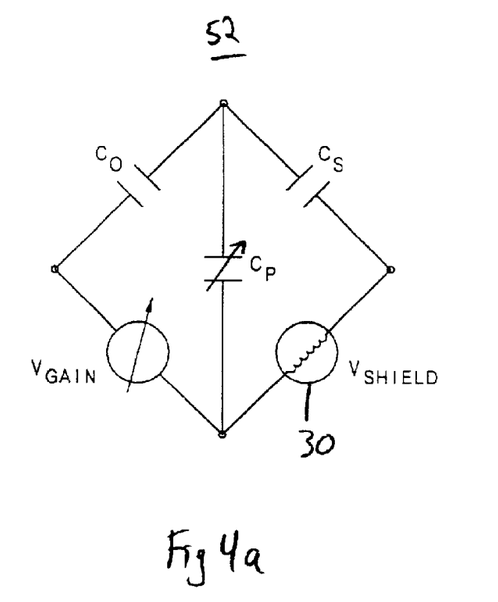
FIGS. 4a and 4b are schematic diagrams of the illustrative circuit of FIG. 2, in accordance with an embodiment of the invention.
Figure 4B:
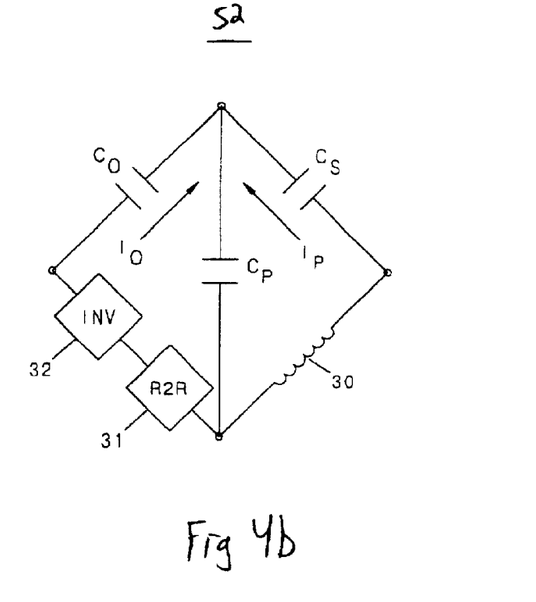

FIGS. 2, 4a, and 4b are schematic diagrams of an illustrative circuit for measuring probe capacitance, setting a threshold capacitance, and adjusting the threshold capacitance. FIGS. 4a and 4b show the bridge portion 52 of the circuit in a more familiar bridge representation with R2R ladder 31 and inverter 32 represented by voltage source $V_{GAIN}$ in FIG. 4a. All points in the circuit in the foregoing discussion are referenced to shield 43.

In more detail, upon applying power to the circuit, bridge 52 (formed by inductor 30, R2R ladder 31, zero capacitor $C_O$, span capacitor $C_S$, and probe capacitance $C_P$) is initially unbalanced. To measure probe capacitance, after powering the circuit, processor 40 begins a balancing process in which comparator 39 receives signals from capacitor $C_S$ via amplifier 38. Initially, during the balancing process, the output state of comparator 39 is high. The output state of comparator 39 is communicated to processor 40 which continues to drive R2R network 31 (a resistance ladder network), incrementing the gain and therefore increasing the zeroing current Io of inverter 32 through capacitance Co. This process continues until Io=Ip, at which time bridge 52 has reached balance and comparator 39 output goes low. The low output signals to processor 40 that balance has been achieved and processor 40 stops incrementing the gain.

Figure 3:
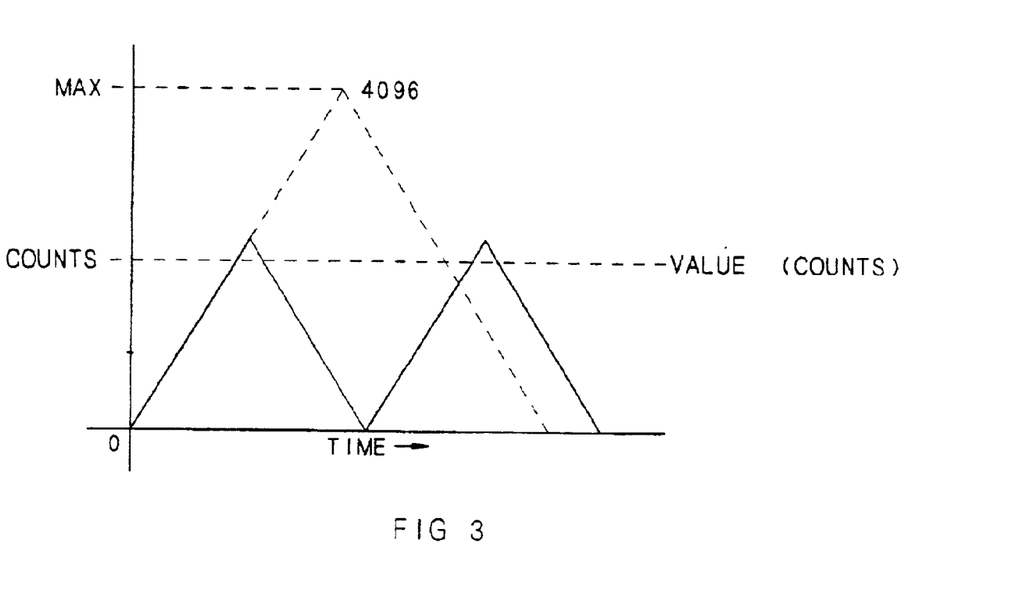
FIG. 3 is a diagram of time versus counts illustrating the operation of a capacitance measuring circuit, in accordance with an embodiment of the invention.

Processor 40 determines the number of increments (counts) to reach a balance condition (FIG. 3). Counts are proportional to probe capacitance $C_P$ and thus processor 40 can convert the number of counts to a value, for example, a capacitance value. Processor 40 continues to determine a number of counts and convert the counts to a capacitance value. In the manner, processor 40 can measure a capacitance value of probe 10, 11.

In one embodiment, processor 40, R2R resistive ladder network 31, switches 42, and inverter 32 are combined to form a 12 bit offset voltage gain multiplier. In order to minimize the effect of hysteresis during incrementing of the gain function (see FIG. 3), processor 40 ramps positive and negative through the trigger (balanced) level and averages the two measured capacitances. This dual ramp integration may minimize the error due to hysteresis and increase the potential count resolution.

Processor 40 is in communication with push buttons 50. One push button is a calibration button that a user can press to initiate a calibration. Another push button is a certify button. The certify button can be used to have the processor determine that the measured capacitance values does not go below a value representative of the probe being exposed to air (i.e., completely uncovered by material). The certify button can also be pressed in conjunction with the calibration button so that a user can select (or indicate) that the probe is covered. With such selection, the calibration may proceed quicker, however, a user does not have to make such a selection for the calibration to be successful.

Processor 40 is further in communication with Electrically Erasable Programmable Read Only Memory (EEPROM) 51. EEPROM 51 provides non-volatile memory storage and may also be any other type of non-volatile memory.

FIGS. 5a through 5d illustrate an embodiment of a method for determining a threshold capacitance value based on the measured capacitance values without a user selecting whether the probe is covered or uncovered. The capacitive value may be an absolute capacitance value, a relative capacitance value, a number of counts, a voltage value, and the like.

Figure 5A:
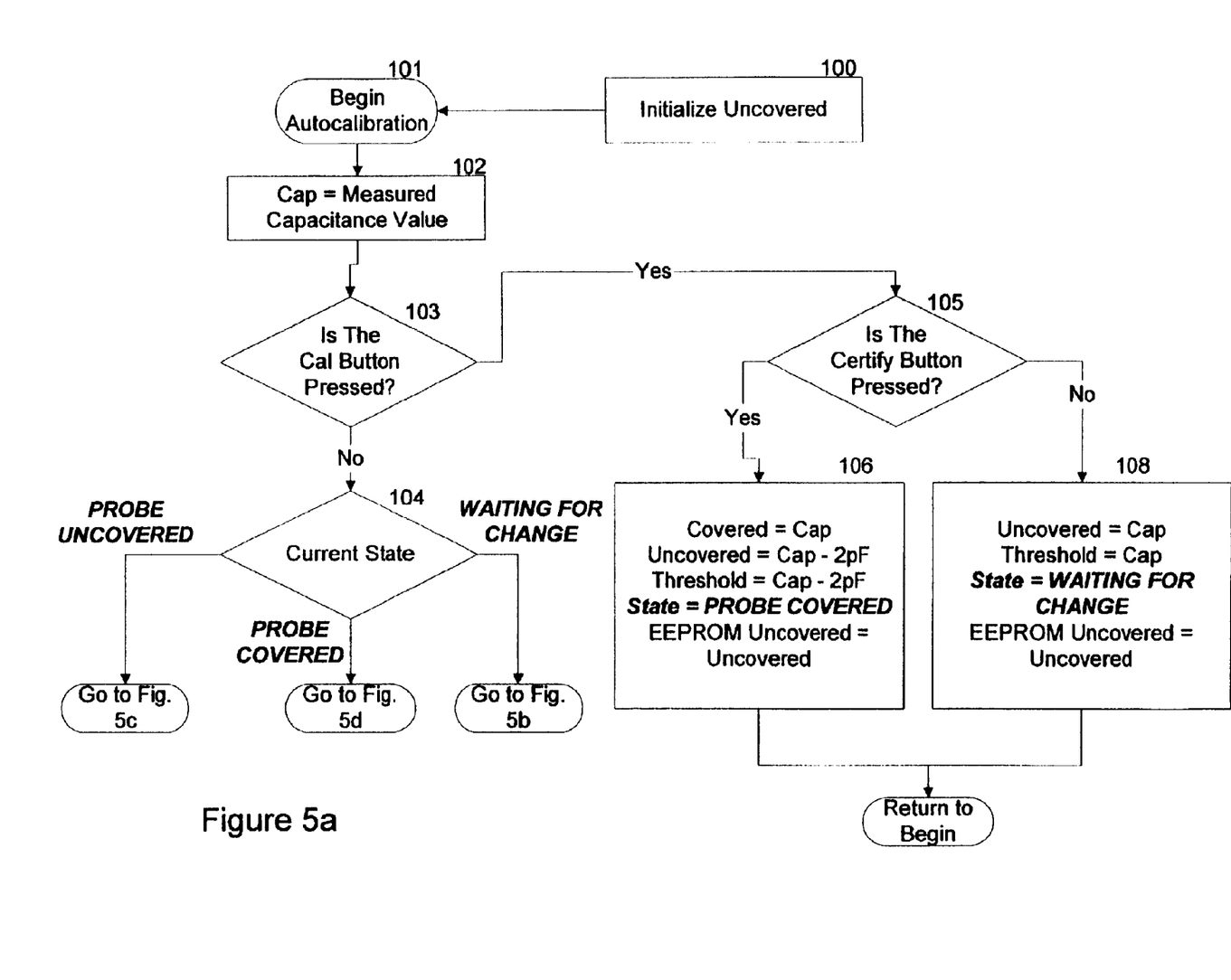
FIGS. 5a through 5d are flow diagrams of an illustrative method for adjusting a threshold for a capacitance point level device without a user selecting whether the probe is covered or uncovered, in accordance with an embodiment of the invention.

As shown in FIG. 5a, at step 100, processor 40 initializes variables. As shown, processor 40 may initialize the uncovered capacitance value by measuring a capacitance value and setting the uncovered capacitance value to the measured value. Alternatively, processor may initialize the uncovered capacitance value to a predefined value (e.g., 10 pF) that may be stored. The predefined value may be read from a non-volatile data store, such as, for example, EEPROM 51. Moreover, the uncovered capacitance value may be stored to EEPROM 51 upon a change in its value or may be stored to EEPROM 51 at various times, for example, when the uncovered capacitance value increases. Other variables may be also initialized, such as, a covered capacitance value, a threshold capacitance value, a current state, and the like.

At step 101, processor 40 begins continually measuring capacitance values and adjusting a threshold capacitance value based on the measured capacitance values. At step 102, processor 40 measures a capacitance value, such as was described in connection with FIGS. 2–4.

As shown at step 103, if a calibration is selected (e.g., a user pressed the calibration button) the method proceeds to step 105 where it is determined if the certify button is pressed (i.e., if the operator has indicated that the probe is covered by pressing both the calibration and certify buttons).

If both the certification button and the calibration button have been selected, processor 40 sets the current state to 'probe covered' as shown in step 106. Further at step 106, processor 40 sets the covered capacitance value to the measured capacitance value, the uncovered capacitance value to the measured capacitance value minus a predefined capacitance value (e.g., 2 pF), and the threshold capacitance value to the measured capacitance value minus a predefined capacitance value (e.g., 2 pF). The predefined capacitance value is typically derived empirically from actual field experience. The method then returns to step 101 to measure another capacitance value. Processor 40 may further set the uncovered capacitance value that is stored in non-volatile memory to the uncovered capacitance value.

If, however, the user has not indicated that the probe is covered, processor 40 sets the current state to 'waiting for change' as shown in step 108. Further at step 108, processor 40 sets the uncovered capacitance value to the measured capacitance value and the threshold capacitance value to the measured capacitance value. Processor 40 may also set the air value to the measured capacitance value. Processor 40 may further set the uncovered capacitance value that is stored in non-volatile memory to the uncovered capacitance value.

The method then returns to step 101 to measure another capacitance value. As can be appreciated, the user does not have to select whether the probe is covered or uncovered; rather, processor 40 waits for a change in capacitance value to determine whether the probe is covered or uncovered. Even if processor 40 makes an incorrect determination, upon further cycling between the covered and uncovered state (i.e., the tank level rising and falling), processor 40 can correct the determination of whether the probe is covered or uncovered, as described in more detail below.

After measuring another capacitance value at step 102, the method again determines if a calibration has been selected at step 103. Assuming for illustrative purposes that the user has released the calibration button and did not indicate that the probe is covered (i.e., did not press the certify button and the calibration button), the method proceeds to step 104.

Figure 5B:
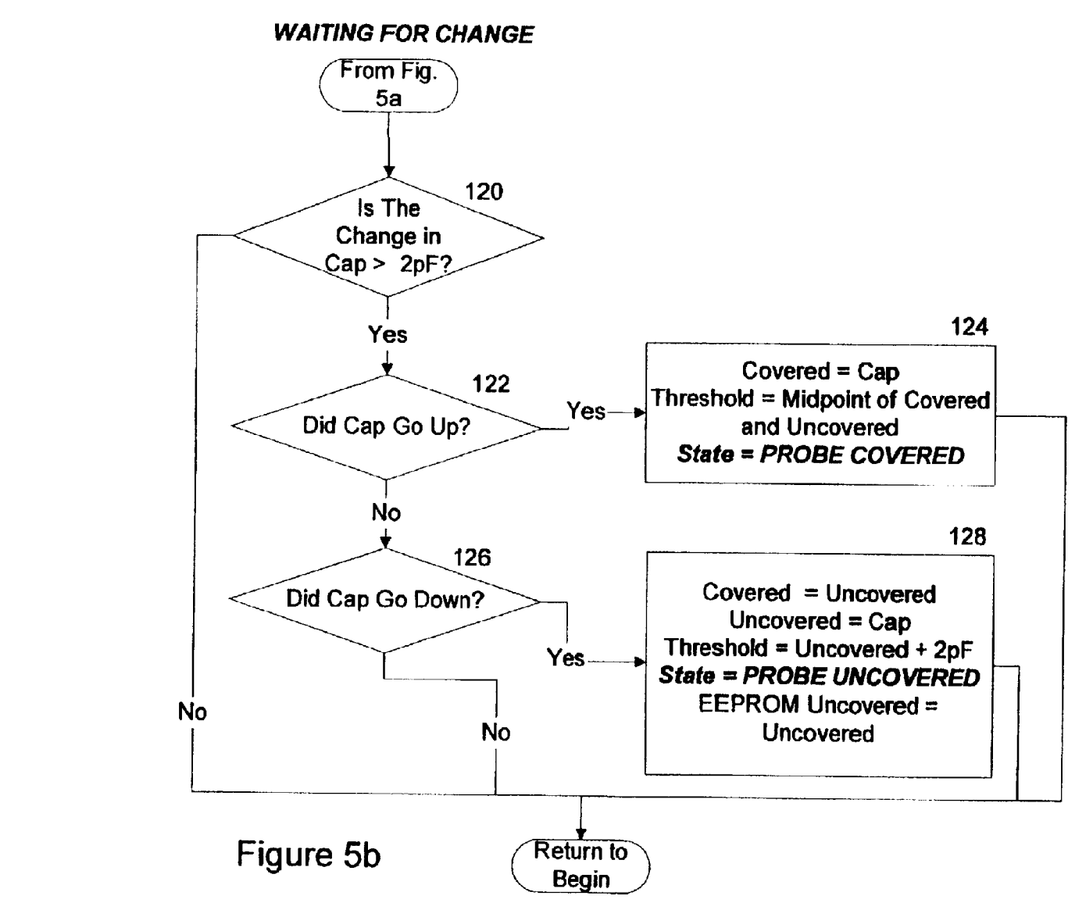

At step 104, because the current state is now 'waiting for change,' the method waits for a change in the measured capacitance value to determine whether the state is covered or uncovered and proceeds to step 120 (FIG. 5b).

At step 120, processor 40 determines if the measured capacitance value has changed by a predefined amount (e.g., 2 pF). If the measured capacitance value has not changed by a predefined amount, processor 40 continues returning to step 101 and measuring capacitance values. Once a measured capacitance value is received that has changed by the predefined amount, the method proceeds to step 122.

At step 122, if the measured capacitance value has increased, the current state is set to 'probe covered,' the covered capacitance value is set to the measured capacitance value, and the threshold capacitance value is set to the midpoint of the uncovered capacitance value and the covered capacitance value. Alternatively, the threshold capacitance value may be set to some other function of the uncovered capacitance value and the covered capacitance value, for example, a square root function or the like.

If the measured capacitance value did not increase, but rather decreased, as shown at step 126, the method proceeds to step 128. At step 128, processor 40 sets the current state to 'probe uncovered,' the covered capacitance value to the uncovered capacitance value, the uncovered capacitance value to the measured capacitance value, and the threshold capacitance value to the uncovered capacitance value plus a predefined capacitance value (e.g., 2 pF). Processor 40 may further set the uncovered capacitance value that is stored in non-volatile memory to the uncovered capacitance value. The method then returns to step 101 and then obtains another measured capacitance value at step 102.

At this point, processor 40 has determined a state of the probe (i.e., whether the probe is covered or uncovered). The determination was based on a change in measured capacitance value. For many reasons, this determination may be incorrect (i.e., the determination may not match the physical state of the probe); however, upon receiving additional measured capacitance values, processor 40 can correct the determination, as described in more detail below.

After measuring another capacitance value, the method again determines if a calibration has been selected at step 103. Again, the user typically has released the calibration button and the method proceeds to step 104.

Figure 5C:
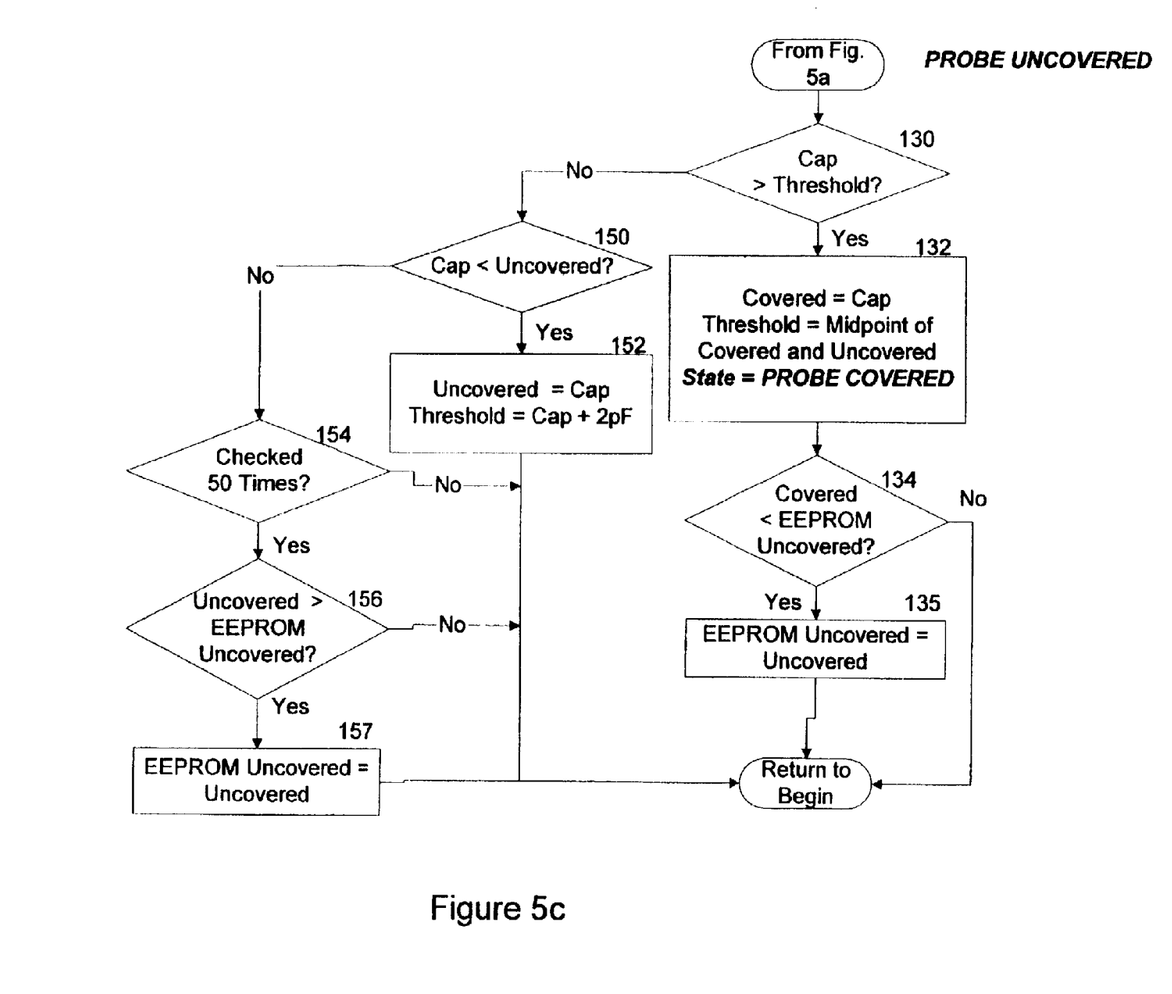

At step 104, assuming now for illustrative purposes that the current state is 'probe uncovered,' the method proceeds to step 130 (FIG. 5c).

At step 130, if the measured capacitance value is not greater than the threshold capacitance value, the method proceeds to step 150.

At step 150, if the measured capacitance value is less than the uncovered capacitance value, the method proceeds to step 152 in which processor 40 sets the uncovered capacitance value to the measured capacitance value and the threshold value to the measured capacitance value plus a predefined capacitance value (e.g., 2 pF). The method then returns to step 101.

However, if at step 150 the measured capacitance value is not less than the uncovered capacitance value, the method proceeds to steps 154 through 157 in which processor 40 may set the uncovered capacitance value that is stored in non-volatile memory to the uncovered capacitance value. Processor 40 may check the measured value a number of times (e.g., 50 times), as shown at step 154, to confirm that the measured capacitance value is less than the uncovered capacitance value, rather that just an errant measurement. If so, and the uncovered capacitance value is greater than the uncovered capacitance value stored in non-volatile memory, processor 40 sets the uncovered capacitance value stored in non-volatile memory to the uncovered capacitance value. The method then returns to step 101.

At step 130, if the measured capacitance value is greater than the threshold capacitance value, at step 132 processor 40 changes the state from 'probe uncovered' to 'probe covered,' the covered capacitance value is set to the measured capacitance value, and the threshold capacitance value is set to the midpoint of the uncovered capacitance value and the covered capacitance value.

The method may then proceed to steps 134–135. At steps 134–135, if the covered capacitance value is less than the uncovered capacitance value stored in non-volatile memory, processor 40 sets the uncovered capacitance value stored in non-volatile memory to the uncovered capacitance value. The method then returns to step 101.

Figure 5D:
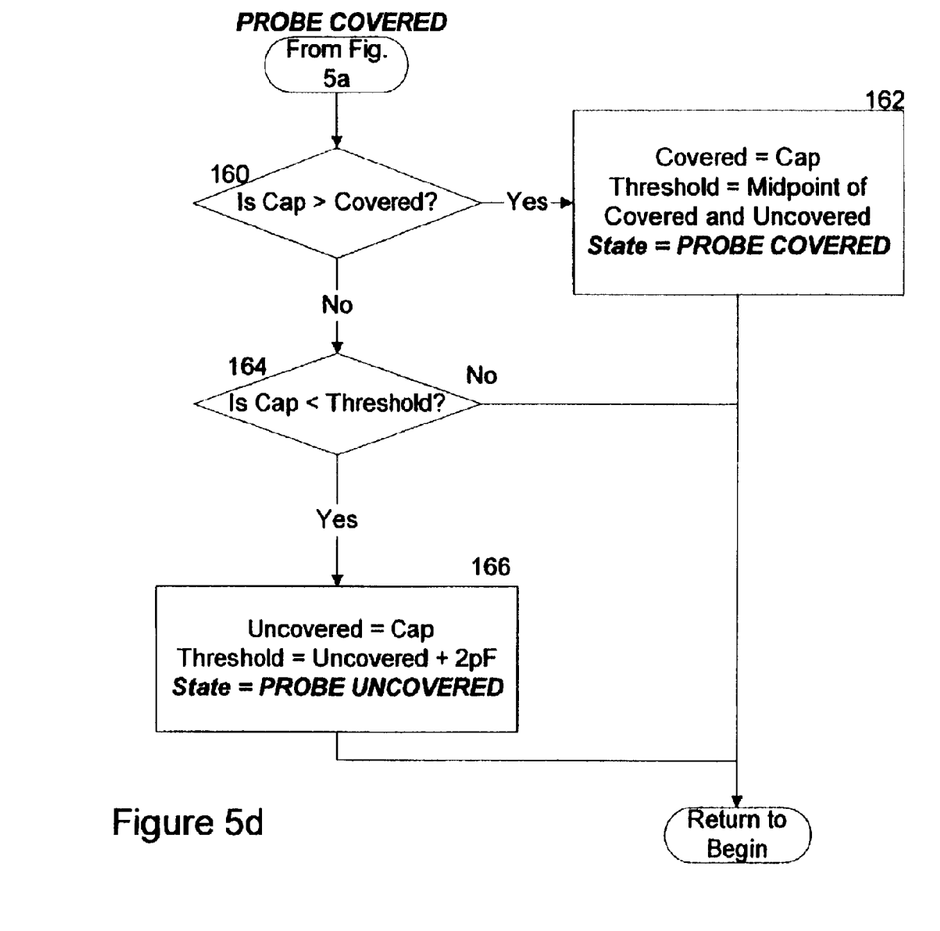

Upon returning to step 104, assuming now for illustrative purposes that the current state is 'probe covered,' the method proceeds to step 160 (FIG. 5d). At step 160, if the measured capacitance value is greater than the covered capacitance value, the method proceeds to step 162 where processor 40 sets the current state to 'probe covered,' the covered capacitance value to the measured capacitance value, and the threshold capacitance value to the midpoint of the uncovered capacitance value and the covered capacitance value. The method then returns to step 101 to obtain another measured capacitance value.

If at step 160, the measured capacitance value is not greater than the covered capacitance value, the method proceeds to step 164. At step 164, if the measured capacitance value is less than the threshold capacitance value, the method proceeds to step 166 where processor 40 sets the current state to 'probe uncovered,' the uncovered capacitance value to the measured capacitance value, and the threshold capacitance value to the uncovered capacitance value plus a predefined capacitance value (e.g., 2 pF). The method then returns to step 101 to obtain another measured capacitance value. Further at step 164, if the measured capacitance value is not less than the threshold capacitance value, the method returns to step 101 to obtain another measured capacitance value.

Before returning to step 101, processor 40 may verify the measured capacitance value against the air value. If the measured capacitance value is less than the air value minus a predefined capacitance value (e.g., 2 pF), processor 40 indicates that verification has failed (e.g., via a light emitting diode, a switch closure for alarm, and the like). Such a verification may be used to indicate a defective sensor, a broken wire, and the like.

Processor 40 may also perform a range check before setting a covered capacitance value and a uncovered capacitance value. For example, before setting a covered capacitance value and a uncovered capacitance value to a new value, processor 40 may compare the new value to a minimum and a maximum value. If the new value is not within the minimum and maximum value, processor 40 does not set the covered capacitance value or the uncovered capacitance value to the new value As an example of determining whether the probe is covered or uncovered, assume that the material in tank 12 is initially water, but may change over time. A typical measured value for the probe covered is 90 pF and 10 pF for an uncovered probe. Further, assume that the operator presses the calibration button, does not indicate that the probe is covered, and that the probe is initially physically covered with water.

At step 100, the uncovered capacitance value is initialized to an exemplary initial measured capacitance value of '90.' Then at step 102, processor 40 measures an exemplary capacitance value of '90' corresponding to the probe being physically covered. Because the certify button was not pressed, processor 40 sets the current state to 'waiting for change,' the uncovered capacitance value to '90,' and the threshold capacitance value to '90,' at step 108.

At this point, the method returns to step 101 and measures a second exemplary capacitance value of '50' (e.g., assuming that the dielectric constant of the material in the tank changed or that the level decreased slightly). The method proceeds to step 120, and then to step 128 because the measured capacitance decreased by more than 2 pF (i.e., from '90' to '50'). At step 128, processor 40 sets the state to 'probe uncovered,' the covered capacitance value to '90,' the uncovered capacitance value to '50,' and the threshold capacitance value to '52.' At this point, processor 40 has selected the 'probe uncovered' state; however, the probe is covered with material (at least partially). Upon receiving additional capacitance measurements, processor 40 can change its selection to match the actual physical state of the probe, as illustrated below in measuring a third exemplary capacitance value.

For example, processor 40 may measure a third exemplary capacitance value of '92' (e.g., assuming that the dielectric constant of the material has changed or the that the material level has increased slightly) at step 101. The method proceeds to step 130, and then to step 132 because the measured capacitance value is greater than the threshold capacitance value (i.e., '92'>'52'). At step 132, processor 40 sets the state to 'probe covered,' the covered capacitance value to '92,' and the threshold capacitance value to '71' (the midpoint of '50' and '92'). As such, processor 40 has selected a state that matches the physical state of the probe, even though the initially selected state did not match the physical state of the probe. Moreover, a user did not have to select the initial state.

As another example, assume that the operator presses the calibration button and the certify button, and indicates that the probe is covered; however, the probe is not covered (e.g., the probe has a capacitance value of '20').

At step 100, processor 40 measures an exemplary initial capacitance value of '20' and sets the uncovered capacitance value '20.' Then at step 102, processor 40 measures an exemplary capacitance value of '20'. Because the certify button was pressed, processor 40 sets the current state to 'probe covered,' the uncovered capacitance value to '18,' (the measured capacitance of '20' minus 2 pF) and the threshold capacitance value to '18,' (the measured capacitance of '20' minus 2 pF) at step 106. At this point, the current state of the device (probe covered) does not match the physical state of the probe (probe not covered). Upon receiving additional capacitance measurements, processor 40 can change its current state to match the actual physical state of the probe.

At this point, the method returns to step 101 and measures a second exemplary capacitance value of '90' corresponding to the physical probe being completely covered (e.g., assuming that the level has increased). The method proceeds to step 160, and then to step 162 because the measured capacitance value is greater than the covered capacitance value (i.e., '90'>'20'). At step 162, processor 40 sets the state to 'probe covered,' the covered capacitance value to '90,' and the threshold capacitance value to '54' (the midpoint of '18' and '90'). At this point, processor 40 has selected the 'probe covered' state and recovered from the incorrect user assumption of probe covered when the probe was not physically covered.

At this point, the method returns to step 101 and measures a third exemplary capacitance value of '10' corresponding to the probe being physically uncovered (e.g., assuming that the level has decreased). The method proceeds to step 160, to step 164, and then to step 166 because the measured capacitance value is not greater than the covered capacitance value (i.e., '10' is not>'90') and the measured capacitance value is less than the threshold capacitance value (i.e., '10' is <'54').

At step 166, processor 40 sets the state to 'probe uncovered,' the uncovered capacitance value to '10,' and the threshold capacitance value to '12' ('10' plus 2 pF). As such, processor 40 has again selected a state that matches the physical state of the probe, even though the user selected state did not match the physical state of the probe.

Thus, the invention provides the ability to continually adjust a threshold capacitance value, thereby adjusting to changes in probe and material conditions, without a user selecting whether the probe is covered or uncovered. Moreover, the invention does not require a special capacitance probe; rather, the invention may be applied to existing conventional capacitance probes. This may be significant because there exists a large number of manually calibrated point level capacitance devices which can be converted to an automatically calibrated device, in accordance with the invention.

The method of the invention may be embodied in the form of program code (i.e., computer-executable instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of illustration and are in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A computerized method for setting a threshold for a point level device, the method comprising the steps of:
    measuring a first value from a point level element prior to setting a variable representative of the state of the point level element to either the covered state or the uncovered state;
    measuring a second value from the point level element prior to setting the variable representative of the state of the point level element to either the covered state or the uncovered state, the second value being different from the first value;
    setting the variable representative of the state of the point level element to either the covered state or the uncovered state based on whether the second measured value has increased or decreased with respect to the first measured value;
    determining a threshold value for establishing whether the point level element is covered or uncovered by a material to be sensed based on one of: (1) the first and second measured values, (2) the first measured value and a predefined value, and (3) subsequent values measured from the point level element; and
    correcting the variable representative of the state of the point level element if subsequent measurements from the point level element indicate that the previous state of the variable representative of the state of the point level element was incorrect.

2. The method as recited in claim 1, wherein the step of measuring a first value comprises measuring a first value from a capacitance probe.

3. The method as recited in claim 1, wherein the step of setting the variable representative of the state of the point level element to either the covered state or the uncovered state comprises the step of setting the variable representative of the state of the point level element to either the covered state or the uncovered state based on whether the second measured value has increased or decreased by a predefined amount with respect to the first measured value.

4. The method as recited in claim 1, wherein the step of determining a threshold value comprises the step of, if the second measured value has increased with respect to the first measured value, determining the threshold value as a function of the first measured value and the second measured value.

5. The method as recited in claim 1, wherein the step of determining a threshold value comprises the step of, if the second measured value has increased with respect to the first measured value, determining the threshold value as the midpoint of the first measured value and the second measured value.

6. The method as recited in claim 1, wherein the step of determining a threshold value comprises the step of, if the second measured value has decreased with respect to the first measured value, determining the threshold value as the second measured value plus a predefined amount.

7. The method as recited in claim 6, further comprising the step of storing the second measured value to non-volatile memory.

8. The method as recited in claim 1, further comprising the step of initializing a value representative of the point level element being uncovered by the material to be sensed to an initial measured value.

9. The method as recited in claim 8, further comprising the steps of, if the second measured value has increased with respect to the first measured value:
    setting a value representative of the point level element being covered by the material to be sensed to the second measured value;
    determining the threshold value as a function of the value representative of the point level element being covered and the value representative of the point level element being uncovered; and
    setting the variable representative of the state of the point level element to the covered state.

10. The method as recited in claim 9, further comprising the steps of, if the second measured value has increased with respect to the first measured value:
    measuring a third value from the point level element; and
    if the third measured value is less than the threshold value and not greater than the value representative of the point level element being covered:
    setting the value representative of the point level element being uncovered to the third measured value;
    setting the threshold value to the value representative of the point level element being uncovered plus a predefined amount; and
    setting the variable representative of the state of the point level element to the uncovered state.

11. The method as recited in claim 9, further comprising the steps of, if the second measured value has increased with respect to the first measured value:
    measuring a third value from the point level element; and
    if the third measured value is greater than the value representative of the point level element being covered:
    setting the value representative of the point level element being covered to the third measured value;
    setting the threshold value to the midpoint of the value representative of the point level element being covered and the value representative of the point level element being uncovered; and
    setting the variable representative of the state of the point level element to the covered state.

12. The method as recited in claim 8, further comprising the steps of, if the second measured value has decreased with respect to the first measured value:
    setting a value representative of the point level element being covered to the value representative of the point level element being uncovered;
    setting the value representative of the point level element being uncovered to the second measured value;
    setting the threshold value to the value representative of the point level element being uncovered plus a predefined amount; and
    setting the variable representative of the state of the point level element to the uncovered state.

13. The method as recited in claim 12, further comprising the steps of, if the second measured value has decreased with respect to the first measured value:

measuring a third value from the point level element; and
    if the third measured value is greater than the threshold value:
        setting the value representative of the point level element being covered to the third measured value;
        setting the threshold value to the midpoint of the value representative of the point level element being covered and the value representative of the point level element being uncovered; and
        setting the variable representative of the state of the point level element to the covered state.

14. The method as recited in claim 12, further comprising the steps of, if the second measured value has decreased with respect to the first measured value:

measuring a third value from the point level element; and
    if the third measured value is less than the value representative of the point level element being uncovered and not greater than the threshold value:
        setting the value representative of the point level element being uncovered to the third measured value; and
        setting the threshold value to the third measured value plus a predefined amount.

15. A computerized method for setting a threshold for a point level device, the method comprising the steps of:

measuring a first value from a point level element, the point level element comprising a capacitance probe, the point level element being responsive to a material to be sensed;
    measuring a second value from the point level element, the second value being different from the first value;
    determining whether the point level element is covered or uncovered based on the first and second values and without receiving a selection of whether the point level element is covered or uncovered from a user interface; and
    determining a threshold value, the threshold value for establishing whether the probe is covered or uncovered, based on one of: (1) the first and second measured values, (2) the first measured value and a predefined value, and (3) subsequent values measured from the point level element.

16. The method as recited in claim 15, wherein the step of measuring a first value comprises the step of determining a number of voltage increments to balance a bridge and converting the number of increments to a capacitance value.

17. A point level device comprising:

a processor that measures a first value from a point level element prior to setting a variable representative of a state of the point level element to either a covered state or an uncovered state, the point level element being responsive to a material to be sensed, measures a second value from the point level element prior to setting the variable representative of the state of the point level element to either the covered state or the uncovered state, the second value being different from the first value, sets the variable representative of the state of the point level element to either the covered state or the uncovered state based on whether the second measured value has increased or decreased with respect to the first measured value, and determines a threshold value for establishing whether the point level element is covered or uncovered, based on one of: (1) the first and second measured values, (2) the first measured value and a predefined value, and (3) subsequent values measured from the point level element, and corrects the variable representative of the state of the point level element if subsequent measurements from the point level element indicate that the previous state of the variable representative of the state of the point level element was incorrect.

18. The device as recited in claim 17, wherein the processor further sets the variable representative of the state of the point level element based on whether the second measured value has increased or decreased by a predefined amount with respect to the first measured value.

19. The device as recited in claim 17, further comprising the point level element.

20. The device as recited in claim 19, wherein the point level element comprises a capacitance probe.

21. A computer-readable medium having instructions stored thereon for automatically setting a threshold for a point level device, the instructions, when executed on a processor, causing the processor to perform the following steps:

measuring a first value from a point level element prior to setting a variable representative of the state of the point level element to either the covered state or the uncovered state;
    measuring a second value from the point level element prior to setting the variable representative of the state of the point level element to either the covered state or the uncovered state, the second value being different from the first value;
    setting the variable representative of the state of the point level element to either the covered state or the uncovered state based on whether the second measured value has increased or decreased with respect to the first measured value;
    determining a threshold value for establishing whether the point level element is covered or uncovered by the material to be sensed based on one of: (1) the first and second measured values, (2) the first measured value and a predefined value, and (3) subsequent values measured from the point level element; and
    correcting the variable representative of the state of the point level element if subsequent measurements from the point level element indicate that the previous state of the variable representative of the state of the point level element was incorrect.

22. The computer-readable medium as recited in claim 21, wherein the step of measuring a first value comprises measuring a first value from a capacitance probe.

23. The computer-readable medium as recited in claim 21, wherein the step of setting the variable representative of the state of the point level element to either the covered state or the uncovered state comprises the step of setting the variable representative of the state of the point level element to either the covered state or the uncovered state based on whether the second measured value has increased or decreased by a predefined amount with respect to the first measured value.

24. A computerized method for setting a threshold for a point level device, the method comprising the steps of:

receiving an initialization, the initialization not including a representation of whether a point level element is covered or uncovered;
    measuring a first value from the point level element, the point level element being responsive to a material to be sensed;

measuring a second value from the point level element, the second value being different from the first value;

determining a threshold value, the threshold value for establishing whether the point level element is covered or uncovered, based on one of: (1) the first and second measured values, (2) the first measured value and a predefined value, and (3) subsequent values measured from the point level element;

determining a value representative of the point level element in a covered state and determining a value representative of the point level element in an uncovered state based on subsequent values measured from the point level element; and adjusting, prior to receiving a subsequent initialization, both the value representative of the point level element being covered and the value representative of the point level element being uncovered based on subsequent values measured from the point level element.

25. The method as recited in claim 24, wherein adjusting the value representative of the point level element being covered comprises, if a measured value from the point level element is greater than the value representative of the point level element being covered, setting the value representative of the point level element being covered to the measured value.

26. The method as recited in claim 25, further comprising:

if the measured value from the point level element is greater than the value representative of the point level element being covered, setting a threshold value, the threshold value for establishing whether the point level element is covered or uncovered, based on the measured value and based on a value representative of the point level element being uncovered.

27. The method as recited in claim 24, wherein adjusting the value representative of the point level element being uncovered comprises, if a measured value from the point level element is less than a threshold value, the threshold value for establishing whether the point level element is covered or uncovered, and the measured value from the point level element is less than the value representative of the point level element being uncovered, setting the value representative of the point level element being uncovered to the measured value.

28. The method as recited in claim 27, further comprising:

if the measured value from the point level element is less than a threshold value, the threshold value for establishing whether the point level element is covered or uncovered, and the measured value from the point level element is less than the value representative of the point level element being uncovered, setting the threshold value to the measured value plus a predefined value.

29. A computerized method for setting a threshold for a point level device, the method comprising the steps of:

receiving an initialization, the initialization not including a representation of whether a point level element is covered or uncovered;

measuring a first value from the point level element, the point level element being responsive to a material to be sensed;

measuring a second value from the point level element, the second value being different from the first value;

determining a threshold value, the threshold value for establishing whether the point level element is covered or uncovered, based on one of: the first and second measured values, the first measured value and a predefined value, and subsequent values measured from the point level element, the threshold value for deciding whether the probe is covered or uncovered; and adjusting, prior to receiving a subsequent initialization, the threshold value in both increasing and decreasing directions based on subsequent measurements from the point level element.

30. The method as recited in claim 29, wherein the step of determining a threshold value comprises the step of, if the second measured value has increased with respect to the first measured value, determining the threshold value as a function of the first measured value and the second measured value.

31. The method as recited in claim 29, wherein the step of determining a threshold value comprises the step of, if the second measured value has increased with respect to the first measured value, determining the threshold value as the midpoint of the first measured value and the second measured value.

32. The method as recited in claim 29, wherein the step of determining a threshold value comprises the step of, if the second measured value has decreased with respect to the first measured value, determining the threshold value as the second measured value plus a predefined amount.

33. The method as recited in claim 24, wherein the initialization is received at a processor in communication with the point level element.

* * * * *